United States Patent [19]
Azzi et al.

[11] 3,900,112
[45] Aug. 19, 1975

[54] GRAVITY STORAGE SYSTEM

[75] Inventors: Victor D. Azzi, Durham; John Wyeth, Exeter, both of N.H.

[73] Assignee: The Kingston-Warren Corporation, Newfields, N.H.

[22] Filed: Apr. 9, 1973

[21] Appl. No.: 348,997

[52] U.S. Cl. ............ 211/148; 193/35 R; 211/49 D; 211/151
[51] Int. Cl. .................... A47f 5/00; B65g 13/12
[58] Field of Search .......... 211/148, 151, 153, 177, 211/182, 184, 49 R, 49 D, 94.5; 193/35 R; 312/341 R, 341 NR, 345, 332, 234.4

[56] References Cited
UNITED STATES PATENTS

| | | | |
|---|---|---|---|
| 1,455,192 | 5/1923 | Dumont | 312/234.4 X |
| 1,563,116 | 11/1925 | Tinsley | 211/151 |
| 1,745,784 | 2/1930 | Davis | 211/182 |
| 1,993,451 | 3/1935 | Michaud | 211/49 D X |
| 2,013,284 | 9/1935 | Michaud | 211/49 D |
| 2,264,120 | 11/1941 | MacDonald et al. | 211/153 |
| 2,302,236 | 11/1942 | Mayne | 211/184 UX |
| 2,649,207 | 8/1953 | Shield | 211/49 D |
| 2,740,513 | 4/1956 | Sullivan | 193/35 R |
| 2,950,014 | 8/1960 | Sullivan | 211/151 |
| 2,964,154 | 12/1960 | Erickson | 193/35 R |
| 2,982,387 | 5/1961 | Hinckley | 193/35 R |
| 3,018,001 | 1/1962 | Combs | 211/49 D |
| 3,040,904 | 6/1962 | St. Amour | 211/182 X |
| 3,063,534 | 11/1962 | St. Amour | 193/38 |
| 3,095,975 | 7/1963 | Cassel et al. | 211/148 |
| 3,269,557 | 8/1966 | Wahl | 211/151 |
| 3,377,771 | 4/1968 | Schmidt | 193/35 R X |
| 3,744,610 | 7/1973 | Tabler | 193/35 R |

FOREIGN PATENTS OR APPLICATIONS

| | | | |
|---|---|---|---|
| 609,711 | 5/1926 | France | 211/85 |
| 294,020 | 6/1968 | Australia | 211/177 |
| 1,467,846 | 12/1966 | France | 211/151 |

*Primary Examiner*—Roy D. Frazier
*Assistant Examiner*—Thomas J. Holko
*Attorney, Agent, or Firm*—Cesari & McKenna

[57] ABSTRACT

A gravity storage system, or live storage, gravity-feed rack assembly or apparatus, characterized by modular units or bays each comprising vertical side frames and horizontal shelf frames. Track and guide means for storage and gravity feed of the racked stock or merchandise. Means for adjustably laterally positioning, and releasably vertically holding down, said track and guide means on said shelf frames.

42 Claims, 9 Drawing Figures

GRAVITY STORAGE SYSTEM

FIELD OF THE INVENTION

The invention pertains to gravity storage systems, or gravity flow racks.

DESCRIPTION OF THE PRIOR ART

Applicants are aware of the U.S. Pat. Nos. to St. Amour 3,040,904, and 3,063,534, and of the references cited in the files thereof, including Davis U.S. Pat. No. 1,745,784; and applicants are additionally aware of the following:

| Patent No. | Inventor |
|---|---|
| 2,160,102 | Hull |
| 2,173,152 | Bauer |
| 2,623,641 | Shield |
| 2,649,207 | Shield |
| 2,715,467 | Smith |
| 2,740,513 | Sullivan |
| 3,018,001 | Coombs |
| 3,064,784 | Nagy |

Various problems of the prior art known to applicants are novelly solved by the invention, whose thus realized objects and improvements will in part appear from the following

SUMMARY OF THE INVENTION

A live or gravity storage system, or gravity flow storage and display assembly, apparatus or rack, providing one or more modular or identical, rigid but demountable units or bays comprising upright or vertical support frames, and one or more lateral or shelf frames mounted therebetween, and presenting tracks and guides on which are deposited from the rear, and gravity fed to the front, the various items of stock or merchandise to be stocked or stored in and displayed or presented for picking from the system.

Means for firmly laterally positioning, correctly aligning, and resiliently vertically holding down, the stock track and guide means. Said positioning, aligning, and holding down means also axially or endwise receiving said track and guide means, whereby said track and guide means are quickly and accurately installed, removed and repositioned, without tools, and in selected positions of track and/or guide width or spacing determination or adjustment laterally of the shelf frames.

Roller track of improved, unitary or one-piece construction.

Stock guide means, or track guides, of improved contstruction, and more particularly of greater strength, rigidity, and durability, or resistance to stock loading or feeding impact.

Means for quick and accurate vertical frame-shelf frame attachment, without tools, providing a maximum of flexibility, and requiring a minimum of adjusting time and labor.

Means for individually and serially identifying and correlating the positions both of the shelf frame heightwise of the vertical frames, and of the shelf guides widthwise of the shelf frames, whereby, merely from an inventory list indicating the sizes and wanted groups of the stock, a comprehensive schedule or profile of shelf and guide locations, and track layout, may be determined, and more particularly computer calculated, eliminating the time and guesswork of pre-planning shelf positioning and layout.

DESCRIPTION OF THE PREFERRED EMBODIMENT

Figure 1:
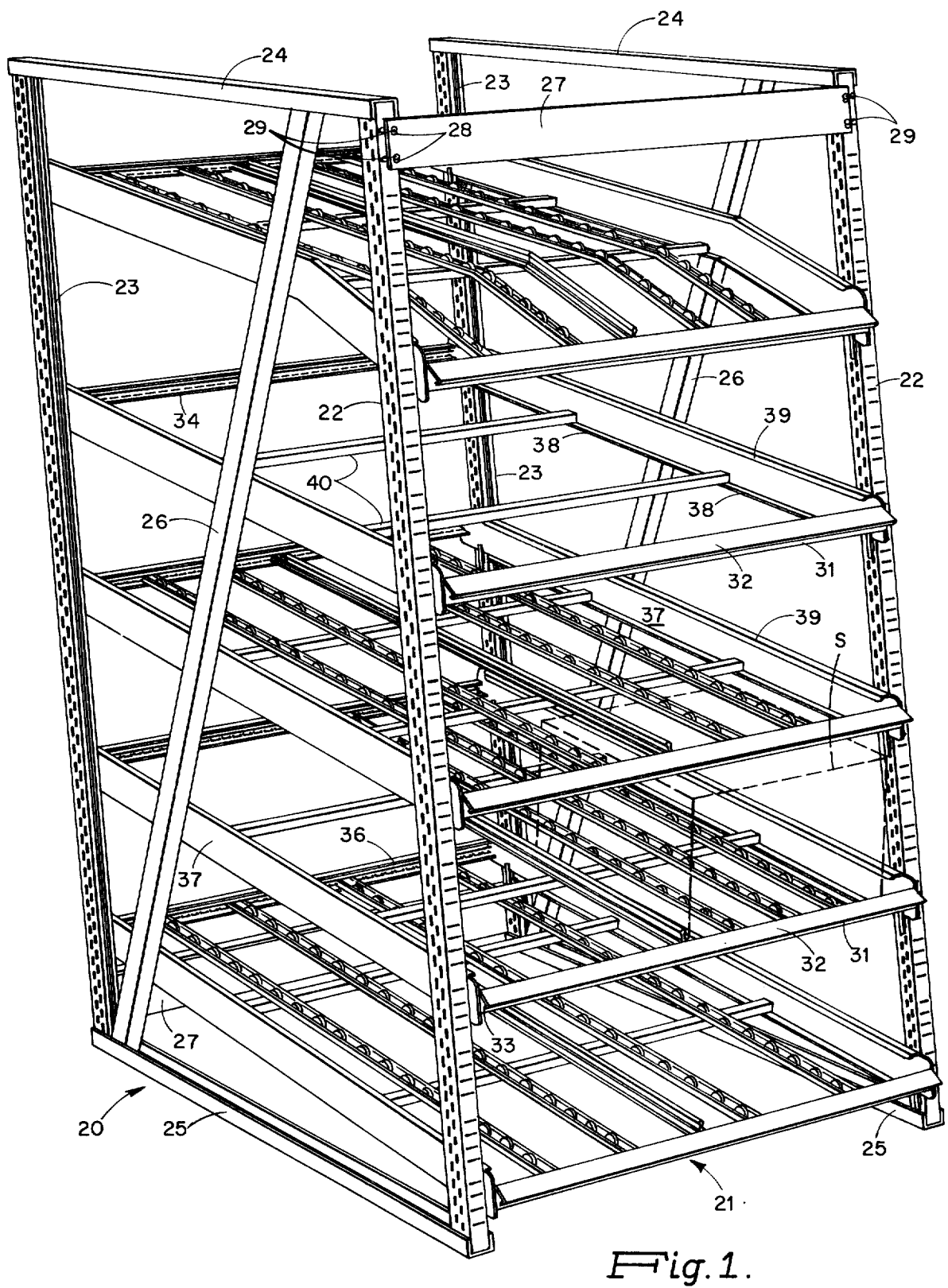
FIG. 1 is a perspective of a rack assembly of the invention.

The invention relates to and improves on prior live storage, gravity feed rack apparatus such as disclosed in St. Amour 3,040,904 and 3,063,534. The rack system hereof, employed in industry, warehousing, and retailing, improves upon standard shelving, in numerous respects. The stock is kept fresh by the gravity feed assuring first-in, first out. The stockmen and orderpickers do less walking and without interference, in that the restocking is done from the back of the racks, and the order picking from the front. The gravity flow system also provides more flexible warehousing of merchandise, and assures rack front filling at all times, with resultant maximum ease and minimum error of order picking, and simplification of stock control.

In the preferred embodiment hereof, the invention gravity storage system provides a rack assembly or apparatus comprising one or more modular or identical units or bays, for installing side by side in repeating, straight line arrangement to form rack assemblies of whatever wanted extent, in line along the transport aisle.

Each said rack bay comprises a vertical or support frame 20, provided at the opposite bay sides or ends, and one or more identical shelves or shelf frames 21, supported from and mounted laterally between the pair of vertical frames 20.

The main vertical or supporting frame 20 comprises front and rear, generally vertical posts or columns 22, 23; horizontal, top and bottom or head and foot members 24, 25; and rigidifying, diagonal brace 26.

The top and bottom members may be channels, and the columns 22, 23 and brace 26 of channel or box construction, and received in and welded to the said top and bottom channels 24, 25, as in a jig.

Diagonal brace 26 may at its one end abut one of the columns 22, 23, top or bottom, and be at its other end positioned at or away from the diagonally opposite intersection of top or bottom channel 24 or 25 with front or rear column 22 or 23.

The front column 22 has a rearward incline or lay back, for front exposure of and easier access to the merchandise or stock S on the thereby successively upwardly set-back shelves 21.

Under the invention, the top and bottom channels 24, 25, as well as the front and rear columns 22, 23, are identically proportioned or lengthed members, whereby the vertical frame 20 predeterminedly is a parallelogram.

Each shelf 21 is thus supported at the rear columns 23 at the same distance as every other shelf is supported from the front columns 22. To thus make the distance between the front and rear support points the same on every shelf affords two important benefits. One is that the maximum carrying capacity of each shelf can be accurately stated, regardless of its location heightwise of the support frames 20. The other is that each may be positionally interchanged with every other of the shelves 21, so far as load carrying capacity is concerned.

Means are provided for combining with the vertical frames 20 to form a rigid, unitary, upright structure for supporting and enclosing the shelf frames 21, the same also enabling the erecting and disassembly of the vertical frames 20 with an absolute minimum of time and labor and without the necessity of any tools. The said means comprise lateral sway braces or plates 27 mounted across the top ends of the front columns 22, and across the bottom or bottom and top ends of the rear columns 23. The sway braces 27 are rigidly, and without tools, interlocked with the columns 22, 23 by their having, at their opposite ends, upper and lower, integral or integrally associated fastenings or keyhole slots 28, engaging or received over and then lowered into locking relation with mating, integral or integrally associated fastenings or headed pins 29 on the said columns 22, 23.

The lateral sway braces 27 span or extend to midway or mid-width of the columns 22, 23, and the pins 29 are provided thereon in double rows, or double vertical columns of two or more, whereby each vertical frame 20 is, in the rack assembly, sway brace interlocked with the vertical frames to its either side, and whereby also each vertical frame 20 doubles as the right-hand support for the one, and the left-hand support for the next, of the two adjacent bays with which it is thus integrally or rigidly associated.

The described vertical frame members 22–26, and the like, to be described members of the shelf frames 21, are formed or rolled steel members, of a heavy guage suited to the stresses or loads here concerned, which may be on the order of, or up to, about 2,800 pounds per shelf.

The shelves or shelf frames 21 comprise front and rear transverse members, and opposite side members overlapping endwise the front and rear members and integrally joined thereto, as by butt welding or otherwise, to form rigid rectangular frames, the same to be provided one or more in each bay, and installed or supported at selected locations and spacings heightwise of the vertical frames 20.

The shelf front transverse members comprise each a horizontal, herein rearwardly directed or infacing, mounting or supporting flange or ledge 30. Extending generally vertically, herein upwardly, from the front margin of ledge 30 is an upstanding web or back 31, which web 31 is inclined rearwardly or bent back somewhat, or so as to be engaged or impacted at the upper margin thereof by the stock or merchandise, as gravity-fed or rolled forwardly to the shelf front.

The front member web 31 is stiffened, as at mid-span and against twisting thereof by the said stock impact, by forwardly-downwardly extending or inclined flange or web 32, the same terminating forwardly in a diagonally or downwardly-rearwardly extending or inturned, relatively shorter flange or lip 33, the latter serving to further stiffen the described integral Z-like front transverse member, and also to present a wanted, smooth, closed-face or edge-free front appearance.

The shelf frame rear transverse members are generally of U-form or channel-like construction, and comprise each a horizontal, herein forwardly directed or infacing mounting or supporting flange or ledge 34. Projecting straight vertically, herein upward, from the rear margin of ledge 34 is an upstanding back or web 35.

The rear transverse shelf frame member terminates upwardly in a forward facing, inturned, horizontal flange or lip 36, the same extending forward of web 35 a distance predeterminedly less than the forward extent of ledge 34, similarly as the rearward extent of front member web 31 is predeterminedly less than that of its associated ledge 30.

The shelf frame side members comprise each a vertical plate or web 37, and at the lower margin thereof a lateral or horizontal, infacing supporting flange or ledge 38, which ledge 38 may be of lesser extent than the web 37, or conveniently stop short of the intersection or engagement thereto of the front and back transverse shelf members.

The shelf frame side members further comprise infacing, rolled or inwardly-downwardly turned guide flanges 39, the same extending from the upper margins of the webs 37 and being folded inwardly and then downwardly to present smooth surfaces to the stock, as that may slidingly bear or engage thereagainst.

The shelf frames further comprise one or more, say, three, intermediate, transverse supporting bars 40, the same laid across and welded or otherwise rigidly joined to the side member ledges 38, and desirably also to the side member webs 37. The relative positioning heightwise of the side member ledges 38, and the thickness of the supporting bars 40, which may conveniently be of inverted channel or box construction, is such as to position the bar 40 top surfaces at the level of, or on line between, the front and back ledges 30, 34.

Means are provided for adjustably-releasably attaching the shelf frames 21 to the vertical frames 20, and more particularly to the front and rear columns 22, 23 thereof: at any desired height thereon; at precisely determined and accurately found positions of selection or adjustment, front and rear, and with a minimum of time and effort; and by merely manual manipulation, or, in other words, without the use of any tools.

The means for adjustable-releasable support-frame: shelf-frame attachment comprises a channel-like hanger clip having an elongated straight web or back 41 spacing intermediate, right angularly or parallel projecting sides 44, from one and the other of which further project latching or hooking tabs 45, 46 which taper or widen to reduced necks 47.

The means for adjustably-releasably attaching the shelf frames 21 to the vertical frames 20 further comprise slit slots 48 cut through the opposite or inner and outer sides or side walls of the columns 22, 23, said slit slots 48 being dimensioned to receive or have passed therethrough the hanger clip tabs 45 and 46.

Figures 4, 5:
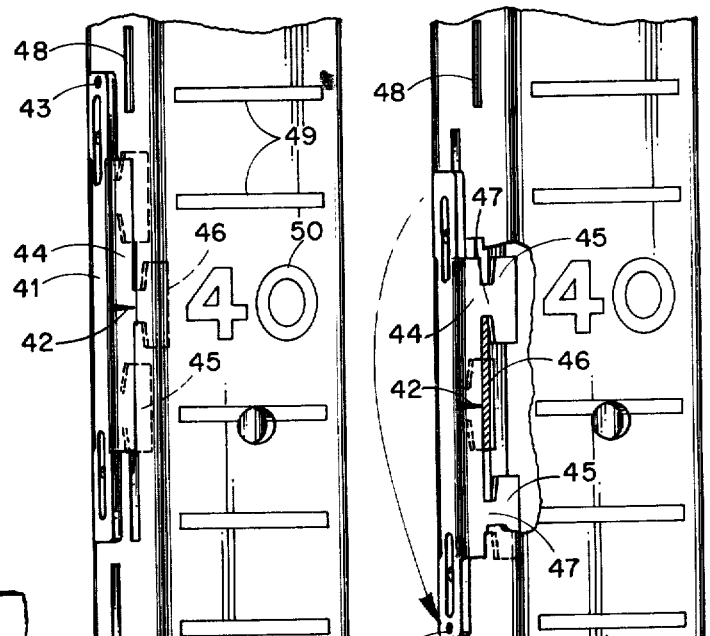
FIGS. 4 and 5 are fragmentary perspectives of a vertical frame column detailing the shelf frame mounting means, and showing different operative positions of the same.
Figure 6:
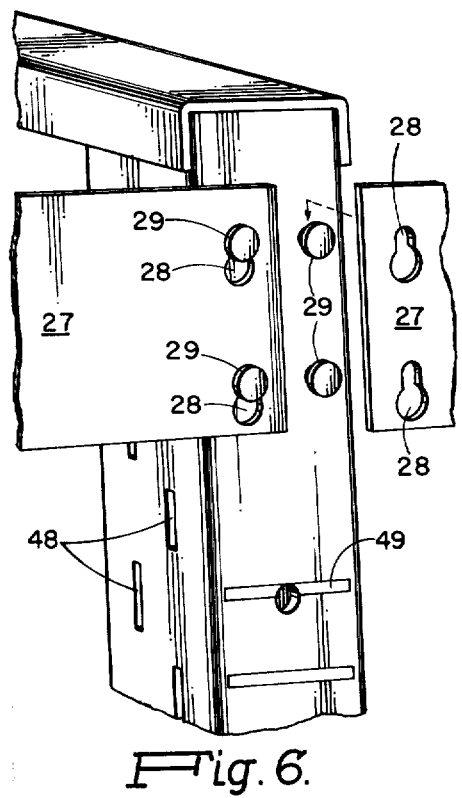
FIG. 6 is a fragmentary perspective of a vertical frame detailing the sway brace fastenings.
Figure 7:
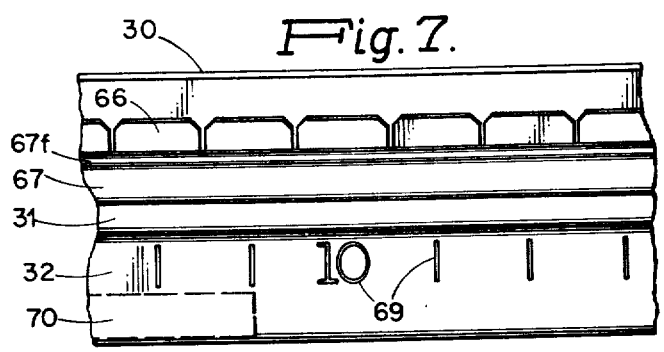
FIG. 7 is a fragmentary top plan of the front track and guide positioner-retainer means.
Figure 9:
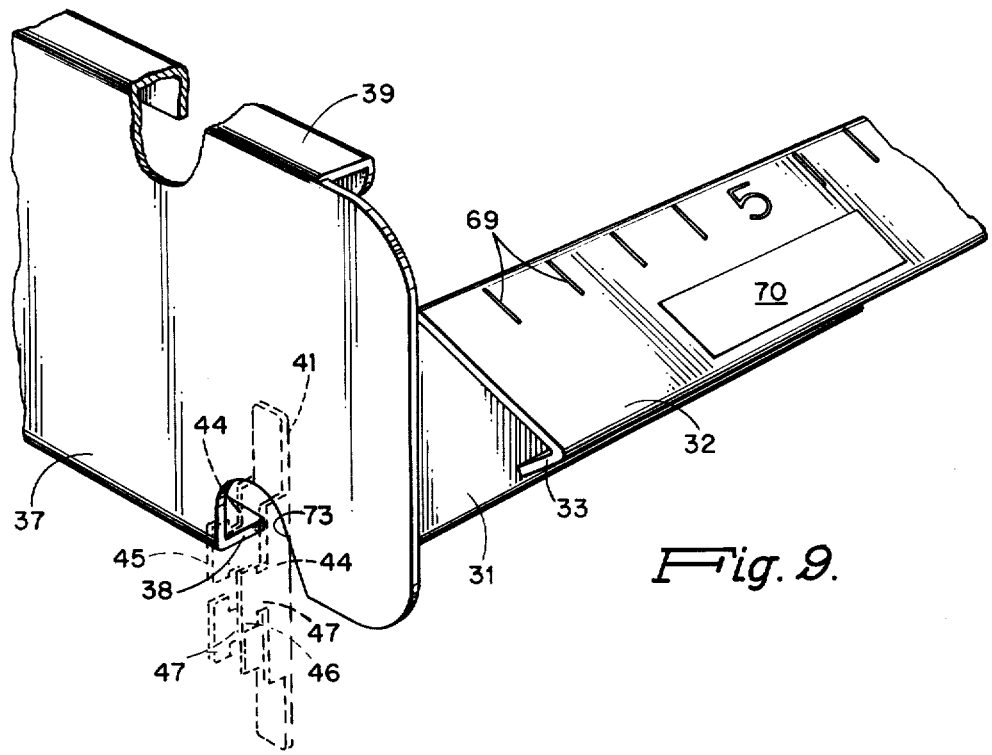
FIG. 9 is a perspective of a shelf frame front corner.

The slit slots 48 further have the same spatial arrangement laterally and vertically of, and at every point along, the columns 22, 23 as the tabs 45, 46 have on the hanger clips, whereby the hanger clips may be inserted into any selected one or another of the repeating geometrically matching patterns of slit slots 48, and may thereafter be dropped or pushed downwardly to engage the necks 47 against the bottom surfaces of the slit slots 48, with the tabs 45, 46 thereby hooked behind, and the hanger clip sides 44 thereby anchored firmly at the front of, the inside or inner sides or side walls of the vertical frame columns 22, 23, as shown in FIGS. 4, 5 and 9.

From the foregoing it will be apparent that to removably, and solely manually, install the shelf frames 21 merely requires the laying or lowering of them into place on the thus mounted hanger clips, with the shelf frame side member webs 37 resting on the upper margins or edges of the hanger clip sides 44 at the rear columns 23, and with the notches 73 at the fronts of both side member webs 37 similarly engaging or receiving therein the hanger clip sides 44 at the front columns 22, to secure the shelf frames 21 in wanted position depthwise or front-wise of the rack.

Means are provided by the invention for installing the shelf frames 21 at half spacings, or half the normal increments or intervals height-wise of the vertical frames 20. This half-interval adjustment capability is herein afforded by providing the tabs 45, 46 in such plurality, and lateral geometrical, herein lateral triangular, array, and providing the slit slots 48 in such matching pattern, plurality and array, that the hanger clips may be differently inserted in the slit slots 48, in one or the other of two opposite or either end up positions, the choice of which may be shown if desired by the provision on the hanger clip backs 41 of a dot 43 or the like indicia of clip orientation, or alternate clip positioning.

The hanger clips also have aligned, mid-point, opposite side scribes 42, the front facing one of which indicates the clip position by its matching with one or another of the scribes 49 of the column 22 or 23, shelf front or back position marking indicia, as represented generally at 50.

As best seen from FIGS. 4 and 5, if a hanger clip is advanced from one to the next position of insertion in a column 22 or 23 which is possible without its flip-flop or reversal, the clip will be advanced, say, from position 40, as represented by the aligning of the (one) clip scribe 42 with the indicia 50 numberal "40", a full interval to the next even numbered position, say, position 42, which position 42 is represented by the second scribe above the numeral "40", of the FIG. 5 column indicia 50. The hanger clip scribe 42 would then be aligned, upon such full interval advance, with that second above "40" or position 42 marking column scribe 49.

But if the hanger clip is reversed or flip-flopped, as from the FIG. 4 to the FIG. 5 position, the tab 46 thereof (and hence also the tabs 45) is seen to be engageable in the intermediately adjacent, herein next lower, slit slot 48 at the opposite side thus locating the (other) clip scribe 42 at the next lower odd numbered or half interval position 39, as represented by the first column scribe below "40", with which position 39 indicating column scribe the clip scribe 42 is seen to be aligned in FIG. 5.

It will be understood that the customer or user determines the pitch or slope angle wanted for the shelf frames 21, and that the provision of the like positioning indicia 50 on the front and rear columns 22, 23 eliminates any guesswork as to the correct front and back placement of the hanger clips thereon, both for proper alignment laterally of the shelf frames, and for positioning of the same with the wanted pitch, that calling for the positioning of the rear of the shelf frame possibly at a full interval of two-scribe spacing (or multiple thereof), or possibly at a half interval or one-scribe spacing (or multiple thereof), above the location of the front of the shelf frame.

The gravity feed tracks hereof comprise one or more, commonly pairs of, channels having each a base or bottom web portion 51 and opposite, upstanding side portions or walls 52, the latter terminating upwardly in outturned, then upturned, then inwardly-downwardly rolled tops or flanges 53.

The gravity feeding tracks are herein also roller tracks, as further defined each by a train of rollers or roller wheels 54 having oppositely projecting stub shafts or axles 55 turning in mating journals or bearings 56 integrally formed in, or dimpled or pressed out of the outturned portions of, the track flanges 53.

The merchandise or stock S advances or is gravity-fed on the shelves 21 herein as conventionally between guides, or guide slides, as provided at the shelf sides by the folded side member flanges 39, and intermediate the same by channel-like slides or guides which in the improved construction hereof comprise lower, outer web or side portions 57 terminating downwardly in flanges or feet 58, which may be outturned or inturned. The guide channels are formed above said webs 57 with inturned lateral shoulders 59, from the inner margins of which upwardly project upper, inner web or neck portions 60, the same terminating upwardly in or surmounted by a rounded top, crown or bulb 61, which latter affords wanted minimum-friction or line contact with the stock S as that may impinge or glance thereagainst, in its gravity or rolling advance forwardly on the tracks to either side of the slide or guide.

The showing of the tracks anad guides in FIG. 1 will be understood as merely representational, and deliberately make less than shelf-filling for clarity of illustration.

Figure 2:
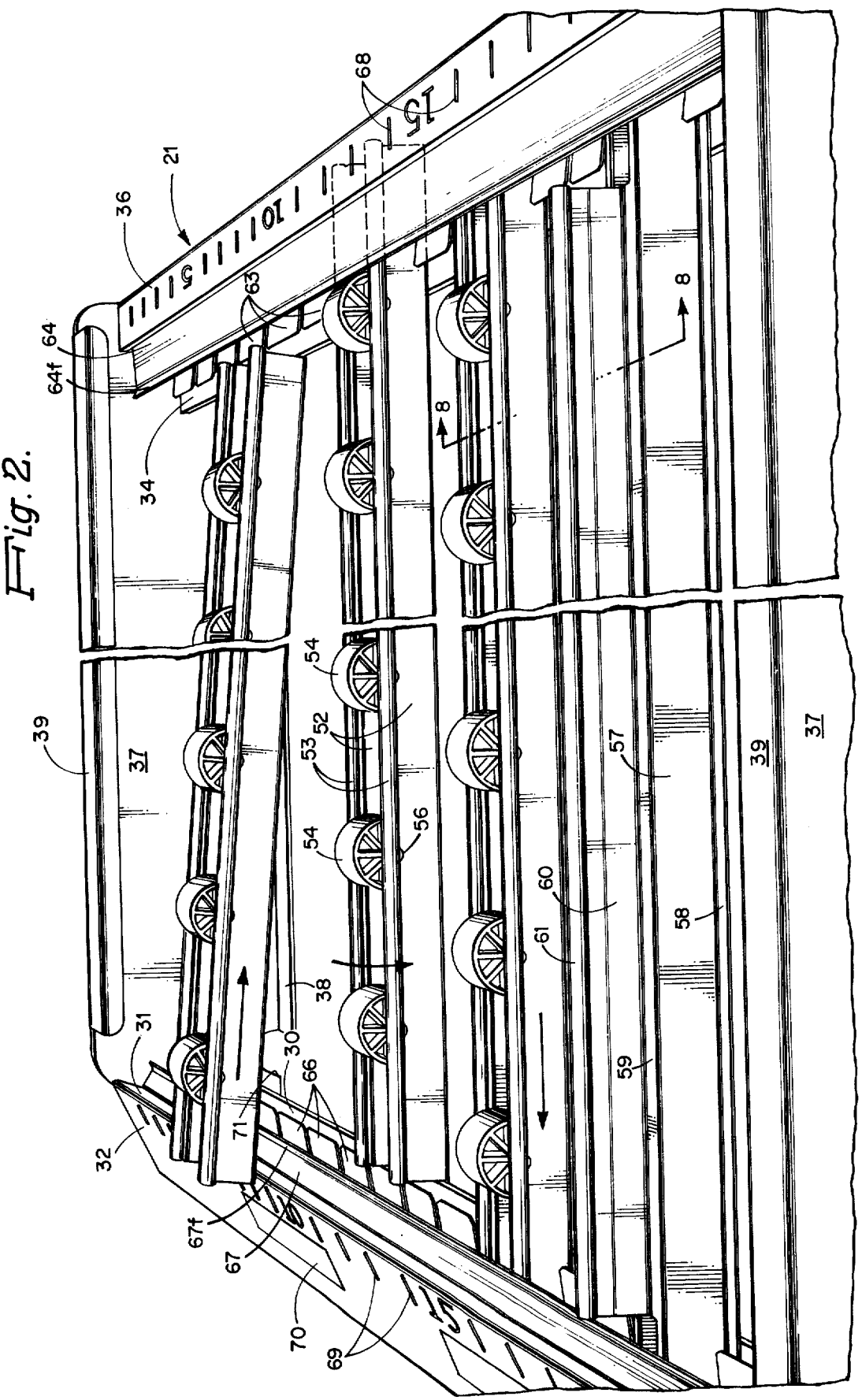
FIG. 2 is a perspective of a shelf-frame, showing roller track thereof in three successive positions of installation of the same, and showing also a track guide.
Figure 8:
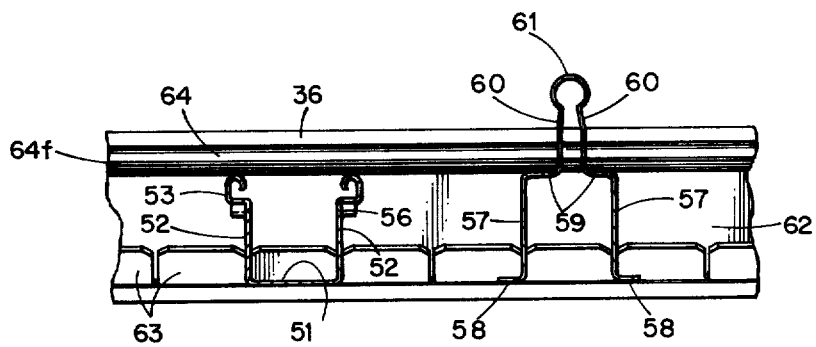
FIG. 8 is a cross section view along the line 8—8 of FIG. 2.

It will be seen particularly from FIGS. 2 and 8 that the guides, which are to be positioned between, and installed and removed similarly as, the tracks, are for that purpose formed at their lower outer webs 57 to the same spacing as have the track sides 52, and further are at their opposite ends cut back, as clearly shown in FIG. 2, to remove lengths of their necks 60 and bulbs 61 enabling their installing-removing manipulation to be described, and leaving or presenting thereat the shoulders 59, as the guide tops to be engaged by the spring retainer flanges to be described.

Positioner-retainer means are provided by the invention for enabling the tracks to be installed and removed, as in repositioning for different widths of, and/or larger or smaller numbers of files or trains of, stock S., FIG. 1, thus: quickly and accurately; without tools; each fixing of the tracks against lateral displacement from their installed or wanted position; and with resilient clamping or biasing of the tracks downwardly against the supporting ledges 30, 34, whereby to stabilize the tracks and releasably secure the same in their installed or mounted position.

Such positioner-retainer means herein comprise integral, spring metal strips or clips associated with or mounted inside the front and rear transverse shelf frame members, and more particularly rigidly affixed, as by spot welding, to their vertical stop or back walls 31, 35. Said spring strip or clip means may extend the full transverse member lengths inside the shelf frame side members, and comprise, at the rear shelf frame backs 35, an upstanding back or web portion 62, and an inwardly-upwardly inclined bottom portion or flange that is parallel-slotted to define a series of inclined or angled fingers or spacer tabs 63 which extend diagonally upward as shown.

The like positioner-retainer means at or inside the front transverse walls or webs 31 of the shelf frames comprise similarly an upstanding back or web portion 65, and an inwardly-upwardly inclined bottom portion or flange that also is parallel-slotted to define a series of inclined or angled fingers or spacer tabs 66 which extend diagonally upward as shown from the bottom margins of the front positioner-retainer means back portion or web 65.

Under the invention, the diagonally upturned positioner-retainer means fingers or spacer tabs 63, 66 are identically formed, in a width to fit them snugly within the sides 52 of the gravity-feed tracks or channels, and similarly within the webs 57 of the track guides, FIG. 8. The spacer tabs 63, 66 of both positioner-retainer means are thus insertable within the ends of the said tracks and guides, on their installing in the shelf frames, and so as thereupon to rigidly fix or hold the channels against displacement or movement from their installed or selected positions, laterally of the shelf frames.

Further under the invention, the positioner-retainer means bottom portions or flanges that are cut into the diagonally upturned spacer tabs 63, 66 are both of a lesser length than, or stop short of the infacing extent of, their associated or juxtaposed transverse member ledges 30, 34. One of said flanges, herein the rear positioner-retainer flange that is cut into the fingers or spacer tabs 63, is of a greater length than the other of said flanges, herein the front positioner-retainer flange that is parallel slotted to define the fingers or spacer tabs 66; this for a reason hereinafter appearing.

The invention positioner-retainer or spring clip means further comprise spring retainer flanges, or spring hinged arms 64, 67, infacing from the spring clip backs or webs 62, 65 from above the track tops 53 and guide shoulders 59, and extending downwardly to engage the said track tops 53 and guide shoulders 59 under spring pressure, or so as to require the spring members or arms 64, 67 to be forced or biased upwardly upon the installing or inserting of the tracks and/or guides in the shelf frame 21.

The spring members or arms 64, 67 accordingly terminate in upturned flanges 64f, 67f by which said members are enabled more readily to ride up over the ends or tops 53 of the tracks, and shoulders 59 of the guides, when the latter are inserted thereunder.

The transverse shelf frame member tops 36, 32 are serially marked as to, or so as to locate and individually identify, each positioning finger 63, 66, as by the correlated series numbering or like indicia 68, 69, along the tops 36, 32 of the transverse shelf frame members, whereby error-free, front to back alignment of the tracks and guides is quickly and easily accomplished without guesswork.

In the insertion of the tracks and guides in the shelf frames 21, for whatever wanted combination or arrangement of number and spacing of the tracks, one end of a track or guide is first positioned for inserting lengthwise under a rear positioner-retainer finger 63, as per top track, FIG. 2. The track or guide is than advanced or pushed rearwardly on the rear transverse member ledge 34 until the front end of the track or guide has passed beyond or cleared the front positioner-retainer means flange 67, as per middle track, FIG. 2, whereupon the said track or guide front end is lowered to rest upon the ledge 30 of the front transverse member.

The track or guide is then simply thrust or pushed forwardly towards the front of the shelf frame, as per lower track, FIG. 2, to a position of sufficient or secure engagement under the front spring retainer flange 67 as well as the rear spring arm retainer flange 64.

From the foregoing it will be seen that the lengths of the tracks and guides are uniform and predeterminedly less than the front-to-rear distance or spacing between the rear positioner-retainer web 62 and front positioner-retainer flange 67. Said uniform track and guide lengths also are sufficiently greater than the distance to the rear transverse member ledge 34, when the tracks and guides are in the fully forward position of FIG. 3 and lower FIG. 2, that the tracks and guides extend and engage also under rear positioner-retainer flange 64, when in that fully forward installed position.

Figure 3:
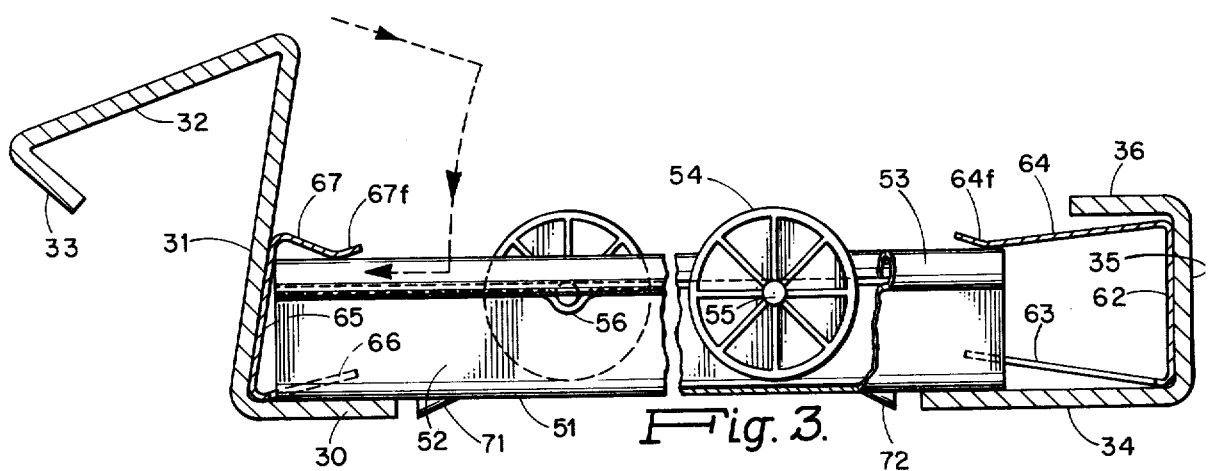
FIG. 3 is a vertical longitudinal section of a shelf frame, showing a roller track in fully installed position.

The tracks may be held in, or against rearward walking or shifting from, the conveniently and preferably fully forward installed position, FIG. 3, by dimples 71, 72 or other bottom projections integrally formed on the tracks and to butt against back ledge 34, upon and to halt said rearward track and guide shifting whichever track end is to the front. That is, the clearing of the rear dimple 72 past the rear transverse ledge 34, upon the said forward thrusting of the track to the installed position of FIG. 3, enables the track web 51 rear end to drop down on the ledge 34 as shown, FIG. 3, whereupon the rear stop projection or dimple 72 may function as just described to assure the both positioner-retainer means engaging, front-to-rear positioning of the track.

As hereinbefore pointed out, in the engagement of the track ends within the positioner-retainer means as just described, the said track ends are rigidly held against lateral movement or displacement by the engaging of the fingers 63, 66 flush against the inside walls of the track sides 52 and guide webs 57. The tracks and guides are clamped down against, and frictionally held endwise on, the ledges 30, 34, by reason of the spring retainer flanges 64, 67 having been forced upwardly, in the said track end installing, and such that the downward extremities or points of the said flanges 64, 67 bear against the track flanges and guide shoulders under spring pressure.

To remove, or replace or reposition the tracks and/or guides, the described installing procedure is simply carried out in reverse.

Under the invention, the described vertical frame column indicia 50, and back and front transverse shelf frame member indicia 68, 69, are utilized to provide a completely new method for pre-planning shelf arrangements, and laying out stock, the new method eliminating the time consuming job of pre-planning shelf layouts that was formerly required, and hence taking out the guesswork, and reducing rack setup time to the bare minimum. Under the new method flowing from this invention, the customer or user simply provides or works up an inventory list indicating size and grouping of stock. The resulting data may then be fed into a computer, suitably programmed, and a comprehensive stock profile is generated. In other words, by the new computer profiling technique, there is rapidly and accurately calculated or determined, and shown on a computer print-out, as to each rack bay, the proper location of each shelf, with reference to or by numbers of the column indicia 50, and the proper location of each guide (and hence each track) of each shelf, with reference to or by the numbers of the transverse shelf member indicia 68, 69.

The described, instant, without tools, snap-in installation and repositioning of the stock tracks and guides and also of the shelf frame hangar clips, together with the quick and accurate calculation of the guide and clip locating and relocating for one and other combination of stock items, will be understood to yield outstanding, heretofore, unrealized, flexibility, efficiency, and economy for the invention rack. The above described rack handling and stock controlling features are complemented still further by the invention provision on the front transverse shelf member flanges 32 of indicia or labels such as indicated at 70 on which may be carried the stock number. This introducing still further efficiencies in stock handling, with the invention rack, in that order picking, and also inventory record and control, may then be carried out by reference to, or with the additional identification of, the stock number.

From the foregoing it will be seen that the entire rack apparatus can be assembled in a minimum amount of time, without tools or measuring devices, and by unskilled personnel. Formerly, it will be understood, the location at which was to be positioned each end of each track or guide had to be determined by a laborious and time consuming process of measuring each said end position of each said track or guide one by one, by reference to its spacing from one shelf side or the other, or by reference to a previously calculated track or guide position, all with a possibility of human error, and indeed of compounded human error, and particularly as to track alignment, or parallelism, which is altogether eliminated by this invention.

Further in accordance with the invention, the shelf frames, and more particularly the shelf frame sides, the tracks and the guides, may be intermediately bent, towards the fronts thereof, to incline their said fronts to a steeper, say, 30° angle, all as clearly shown on and by the top shelf, FIG. 1, and with the result that stock items with which such bent shelves are front-filled are inclined at the same steeper angle, for greater visibility and easier picking.

We claim:

1. In a gravity-feed, live storage system, in combination,
    a plurality of vertical support frames;
    a plurality of vertically spaced shelf frames mounted between said support frames, said shelf frames comprising
    front, back and side members;
    supporting ledges formed on said front and back shelf frame members;
    means for releasably-adjustably attaching said shelf frames to said vertical support frames;
    gravity-feed track means installed between said front and back shelf frame members on their said supporting ledges;
    positioner means fixedly associated with said front and back shelf frame members and endwise engaging said track means to align, longitudinally limit, and laterally fix aaid track means in structurally determined positions on said supporting ledges; and
    retainer means associated with said front and back shelf frame members, said retainer means infacing from above, and extending downwardly to engage, portions of said track means under spring pressure and whereby said track means are clamped down against said supporting ledges in secure engagement under said retainer means.

2. The apparatus of claim 1, wherein each said vertical support frame comprises a rigid unitary assembly of horizontal top and bottom members, parallel-inclined front and back columns, and a diagonal brace.

3. The apparatus of claim 2, wherein said top and bottom members are channel members, and receive the ends of said columns and brace.

4. The apparatus of claim 3 when said columns and brace are box members.

5. The apparatus of claim 1, and
    anti-sway plates mounted laterally between said vertical support frames, and
    means for removably attaching said anti-sway plates without tools.

6. The apparatus of claim 5, wherein said anti-sway plates are mounted across the top of one of, and across the bottom of the other of, said vertical support frames.

7. The apparatus of claim 6, wherein said removably attaching means comprise
    pins on one and slots on the other of said plates and vertical support frames.

8. The apparatus of claim 7, wherein said slots comprise keyhole slots on said plates.

9. The apparatus of claim 7, wherein said vertical support frames comprise upstanding columns, and wherein said pins comprise headed pins on said columns.

10. The apparatus of claim 1, wherein said front and back member associated track retainer means comprise a spring retainer flange extending downwardly to an extent requiring it to be deflected upwardly upon the installing of said gravity-feed track means.

11. The apparatus of claim 1, wherein said positioner means and retainer means together are integrally formed from an elongated metal strip.

12. The apparatus of claim 1, wherein said positioner means and retainer means are integral one with the other, wherein said positioner means comprise spacer tabs, and wherein said retainer means comprise a spring flange.

13. The apparatus of claim 1, and guide means installed on said shelf frames intermediate said track means.

14. The apparatus of claim 13, wherein said guide means comprise spaced lower sides terminating upwardly in inturned shoulders, said inturned shoulders terminating inwardly in upstanding webs, and a bulb surmounting and joining said upstanding webs.

15. The apparatus of claim 14, wherein said track means comprise upstanding sides having the same spacing as said guide sides.

16. The apparatus of claim 13, wherein said shelf frame members and said track and guide means thereon are intermediately bent, towards the fronts thereof, to incline their said fronts to a steeper angle and to provide greater visibility and easier picking of stock items filling said fronts.

17. The apparatus of claim 1, wherein said track means comprise a bottom web, upstanding sides, and outturned top flanges.

18. The apparatus of claim 17, and journals integrally formed in said track flanges, and rollers having axles received in said journals.

19. The apparatus of claim 1, wherein said front shelf frame members comprise each
   a ledge extending rearwardly,
   a back extending upwardly from the front of said ledge, and
   a stiffening flange extending forwardly from the top of said back.

20. The apparatus of claim 1, wherein said back shelf frame members comprise each
   a ledge extending forwardly,
   a back extending upwardly from the rear of said ledge, and
   a flange extending forwardly from the top of said back.

21. The apparatus of claim 1, wherein said shelf frame side members comprise each
   an upstanding web,
   a supporting ledge extending inwardly from the bottom of said web, and
   a guide flange extending inwardly from the top of said web.

22. The apparatus of claim 1, and means associated with said vertical support frames and shelf frames for determining the correct positioning and alignment of said shelf frames on said vertical support frames, and for determining the correct positioning and alignment of said track means in said shelf frames, without measuring.

23. The apparatus of claim 22, wherein said shelf frame positioning and alignment determining means comprise
   indicia individually identifying each shelf frame position at each point of support on said vertical support frame.

24. The apparatus of claim 22, wherein said track means positioning and alignment determining means comprise
   indicia carried on said front and back shelf frame members for individually identifying front and back each track means position laterally of said shelf frames.

25. The apparatus of claim 1, wherein said shelf frame attaching means are manually manipulable without tools.

26. The apparatus of claim 25, wherein said manually manipulable shelf frame attaching means comprise hanger clips.

27. The apparatus of claim 26, and notches in said shelf frame side members for receiving said hanger clips.

28. The apparatus of claim 26, wherein said vertical support frames comprise
   front and back columns, and
   slit-slots in said columns for receiving said hanger clips.

29. The apparatus of claim 1, wherein said shelf-frame attaching means are so constructed and arranged whereby they are manipulable in one and another orientation to adjust said shelf frames between full interval or half interval positions, or multiples thereof.

30. The apparatus of claim 1, wherein said shelf-frame attaching means comprise
   hanger means for supporting said shelf frames within said vertical support frames, and
   vertical frame formations for releasably latching said hanger means.

31. The apparatus of claim 30, wherein said formations are repeating vertically of said vertical support frames, and wherein said hanger means and formations comprise interlocking tabs and slots so geometrically ordered as to be engageable in certain positions upon one orientation of said hanger means, and in other positions upon another orientation of said hanger means.

32. The apparatus of claim 1, wherein said vertical support frames are of modular, duplicate construction.

33. The apparatus of claim 1, and stock guide means intermediate said track means on said shelf frame and
   fixed positioning indicia for enabling the determination through computation, and from the sizes and wanted groupings of items of stock, of the proper location of each said shelf frame heightwise of said vertical support frames, and of the proper location of each said guide means laterally of each said shelf frame.

34. The apparatus of claim 33, wherein said vertical support frames comprise supporting columns, wherein said guide means are installed at the fronts and backs of said shelf frames, and wherein said computation enabling means comprise
   means providing a series of fixed and determinate positions of mounting of said shelf frames heightwise of said vertical support frames, at each point of attachment of said shelf frames to said supporting columns;
   means for individually identifying and locating each said vertical position and column attachment point of each said shelf frame;
   means providing a series of fixed and determinate positions of said guide means laterally of said shelf frames, at each point of installation of said guide means at the fronts and backs of said shelf frames; and
   means for individually identifying and locating each said lateral position and front and back attachment point of each said guide means.

35. The apparatus of claim 1, wherein said shelf frame side members and said track means thereon are intermediately bent, towards the fronts thereof, to incline their said fronts to a steeper angle, and to provide greater visibility and easier picking of stock items filling said fronts.

36. In a gravity-feed, live storage system, in combination,
   a plurality of vertical support frames;
   a plurality of vertically spaced shelf frames mounted between said support frames, said shelf frames comprising
      front, back and side members;

supporting ledges formed on said front and back shelf frame members;

means for releasably-adjustably attaching said shelf frames to said vertical support frames;

gravity-feed track means installed between said front and back frame members on their said supporting ledges;

positioner means fixedly associated with said front and back frame members and endwise engaging said track means to align, longitudinally limit, and laterally fix said track means in structurally determined positions on said supporting ledges; and retainer means associated with said front and back shelf frame members and spring biasing said track means down against said supporting ledges, said track means being of a length such that, and said front and back positioner means and retainer means being of different extent endwise of said track means such that, when fully inserted at their one ends in one of said front and back positioner means and retainer means, said track means clear at their other ends the other of said front and back positioner means and retainer means, and when fully inserted at their other ends in said other of said front and back positioner means and retainer means, said track means are at their one ends engaged to and biased downwardly by said one of said front and back positioner means and retainer means.

37. The apparatus of claim 36, wherein said front and back supporting ledges, positioner means and retainer means, and track means ends are constructed and arranged for opposite sliding advance of said track means on said ledges and under said retainer means endwise of said positioner means to their either end, fully inserted positions, whereby, in the installation of said track means on said shelf frames, the one ends of said track means are engaged on one of said ledges and advanced thereon, between said one of said positioner means and deflecting upwardly said one of said retainer means, until the other ends of said track means are brought past overlying relation to said other of said positioner means and retainer means; mounted between said support frames, said shelf frames comprising front, back and side members;

supporting ledges formed on said front-and back shelf frame members;

means for releasably-adjustably attaching said shelf frames to said vertical support frames;

gravity-feed track means installed between said front and back shelf frame members on their said supporting ledges;

positioner means fixedly associated with said front and back shelf frame members and endwise engaging said track means to align, longitudinally limit, and laterally fix aaid track means is structurally determined positions on said supporting ledges; and retainer means associated with said front and back shelf frame members, said retainer means infacing from above, and extending downwardly to engage, portions of said track means under spring pressure and whereby said track means are clamped down against said supporting ledges in secure engagement under said retainer means.

38. In a gravity-feed, live storage system, in combination, a plurality of vertical support frames;

a plurality of vertically spaced shelf frames mounted between said support frames, said shelf frames comprising front, back and side members;

supporting ledges formed on said front and back shelf frame members;

means for releasably-adjustably attaching said shelf frames to said vertical supporting frames;

gravity-feed track means installed between said front and back shelf frame members on their said supporting ledges;

positioner means fixedly associated with said front and back shelf frame members and endwise engaging said track means to align, longitudinally limit, and laterally fix said track means in structurally determined positions on said supporting ledges; and retainer means associated with said front and back shelf frame members and spring biasing said track means down against said supporting ledges, said track means having upstanding sidewall portions, and said front and back member associated track positioner means comprising spacer tabs snugly fitting within said sidewall portions of said installed, gravity-feed track means.

39. In a gravity-feed, live storage system, in combination, a plurality of vertical support frames;

a plurality of vertically spaced shelf frames mounted between said support frames, said shelf frames comprising front, back and side members;

supporting ledges formed on said front and back shelf frame members;

means for releasably-adjustably attaching said shelf frames to said vertical support frames;

gravity-feed track means installed between said front and back shelf frame members on their said supporting ledges;

positioner means fixedly associated with said front and back shelf frame members and endwise engaging said track means to align, longitudinally limit, and laterally fix said track means in structurally determined positions on said supporting ledges; and retainer means associated with said front and back shelf frame members and spring biasing said track means down against said supporting ledges, said track means having upstanding sidewall portions; and said front and back member associated track positioner means and retainer means comprising spacer tabs snugly fitting endwise within said sidewall portions of said installed gravity-feed track means, and a spring retainer flange positioned to be deflected upwardly by the installing of, and thereby to bias downwardly, said track means.

40. In a gravity-feed, live storage system, in combination, a plurality of vertical support frames;

a plurality of vertically spaced shelf frames mounted between said support frames, said shelf frames comprising front, back and side members;

supproting ledges formed on said front and back shelf frame members;

means for releasably-adjustably attaching said shelf frames to said vertical support frames;

gravity-feed track means installed between said front and back shelf frame members on their said supporting ledges;

positioner means fixedly associated with said front and back shelf frame members and endwise engaging said track means to align, longitudinally limit, and laterally fix said track means in structurally determined positions on said supporting ledges; and retainer means associated with said front and back shelf frame members and spring biasing said track means down against said supporting ledges, said track means having upstanding sidewall portions, said front and back member associated track positioner means and retainer means comprising spacer tabs snugly fitting endwise within said sidewall portions of said installed gravity-feed track means, and a spring retainer flange positioned to be deflected upwardly by the installing of, and thereby to bias downwardly, said track means, and said spacer tabs and retainer flange comprising an elongated, integral, spring metal clip.

41. The apparatus of claim 40, wherein said front and back shelf frame members have upstanding web portions, and said other ends of said track means are then lowered to engage the other of said ledges; and said track means are then advanced reversely on said other ledge, engaging said other of said positioner means and deflecting upwardly said other of said retainer means, to full insertion in said other of said positioner means without disengagement of the one ends of said track means from their aforesaid engagement with said one of said positioner means and under said one of said retainer means.

42. In a gravity-feed, live storage system, in combination, a plurality of vertical support frames;

a plurality of vertically spaced shelf frames mounted between said support frames, said shelf frames comprising front, back and side members;

supporting ledges formed on said front and back shelf frame members;

means for releasably-adjustably attaching said shelf frames to said vertical support frames;

gravity-feed track means installed between said front and back shelf frame members on their said supporting ledges;

positioner means fixedly associated with said front and back shelf frame members and endwise engaging said track means to align, longitudinally limit, and laterally fix said track means in structurally determined positions on said supporting ledges;

retainer means associated with said front and back shelf frame members and spring biasing said track means down against said supporting ledges; and guide means installed on said shelf frames intermediate said track means, said guide means comprising spaced lower sides terminating upwardly in inturned shoulders, said inturned shoulders terminating inwardly in upstanding webs, and a bulb surmounting and joining said upstanding webs, and said webs and bulb of said guide means being cut off and to leave end lengths of said lower sides and inturned shoulders of said guide means that are received under said retainer means.

* * * * *

UNITED STATES PATENT OFFICE
CERTIFICATE OF CORRECTION

Patent No. 3,900,112              Dated August 19, 1975

Inventor(s) Victor D. Azzi and John Wyeth

It is certified that error appears in the above-identified patent and that said Letters Patent are hereby corrected as shown below:

Column 10, line 11, "aaid" should read -- said --
Column 12, line 25, "frame" should read -- frames --
Column 13, line 36, after "means" insert -- and --
Column 13, lines 46 through 67 should read -- means and retainer means;
  said other ends of said track means are then lowered to engage the other of said ledges; and
  said track means are then advanced reversely on said other ledge, engaging said other of said positioner means and deflecting upwardly said other of said retainer means, to full insertion in said other of said positioner means without disengagement of the other ends of said track means from their aforesaid engagement with said one of said positioner means and under said one of said retainer means. --

Column 15, line 30 through Column 16, line 2 should read

-- wherein said spring metal clip comprises a back portion intermediate said spacer tab and retainer flange, said back portion rigidly fixed to said front and back shelf frame member web portions. --

Signed and Sealed this

Tenth Day of May 1977

[SEAL]

Attest:

RUTH C. MASON
Attesting Officer

C. MARSHALL DANN
Commissioner of Patents and Trademarks